Patented June 24, 1930

1,766,131

UNITED STATES PATENT OFFICE

JACOB S. KOMINZ, OF ROCHESTER, NEW YORK

CYTO-VACCINE OF TUBERCLE BACILLI

No Drawing.     Application filed October 29, 1923.   Serial No. 671,390.

The present invention relates to a cyto-vaccine of tubercle bacilli and an object of the invention is to provide a vaccine which when injected in a mammal or a human being will produce immunizing and therapeutic reactions without creating abscesses.

In carrying out this invention, virulent cultures of tubercle bacilli are grown on a suitable media either solid or fluid and are then carefully and, with sterile precautions, removed into a small quantity of sterile solution such as a normal saline solution or sterile water to make them available for injection into an animal. The sterility of the solution is desired in order to avoid contamination with other organisms, while the normal saline solution is used, in preference to any other solution, because it is present in fluid portions of the body in considerable quantity. This solution enables the determining of the number of bacteria per cubic centimeter of solution, so as to keep a record of the total of bacteria injected into the animal used for the production of the vaccine.

The suspension of the live tubercle bacilli in the normal salt solution is then subjected to a treatment to kill the bacilli preferably heating at a temperature of between 60° to 80° C. for a length of time sufficient to insure the absolute killing of the tubercle bacilli in the suspension, in order that the essential components in the body of the bacilli are not altered by the killing, so that when injected into an animal, the defensive reaction will be a complete one against all of the elements present in the bacteria unchanged. To maintain the original degree of concentration of bacilli in the solution enough solution is added if needed to make up the original quantity, this being done in order to maintain a record of bacteria used.

The killed tubercle bacilli in suspension in the normal saline solution is then injected in fixed quantity in some healthy mammal preferably in one whose resistance to this type of infection is known to be high, for the reason that a powerful reaction is desired on the part of the organism of the fixed tissue cells to the irritation thus produced. In the attempt to rid itself of the irritation, the mammal is able to throw out at the point of irritation defensive antibodies and enzymes in sufficient quantity to overcome more or less completely the toxine and irritating substances introduced. These defensive substances produce more or less complete solution of the waxy capsule surrounding the bacteria, and neutralize more or less completely the toxic protein molecules present. There is enough of these defensive substances left over so that, if withdrawn from the animal and injected into another animal, they will stimulate the production of similar protective anti-bodies especially since there is a quantity of the tubercle toxine still remaining unacted on. As the injection is made sub-dermally in the mammal, the part where the injection is to be made is clipped, shaved and antiseptically prepared, and, in the preparation of the needle and syringe and also in the making of the injection, the strictest aseptic precautions are followed to avoid contamination with other organisms. After the lapse of a variable period of four to eight weeks, a fluctuating mass develops at the site of the injection. This mass is then evacuated under strict aseptic and antiseptic precautions.

It has been found that some of the tubercle bacilli in the animal are only partially digested by the defensive anti-bodies thrown out by the animal and these partially digested bacilli will if injected in a human being or mammal produce irritation. In order to avoid this irritation by these undigested and unacted upon capsule structures still remaining, the material evacuated from the animal is prepared in a glass mortar with a suitable chemical as, for example, a quantity of pure ether or ether vapor. When using ether, the ether and the material are then thoroughly rubbed and mixed together until all lumps have disappeared and a thin homogeneous material remains. To rid the product of any ether which may remain and which is both unnecessary and undesirable, the removal of the ether is obtained by slow evaporation, as by heating the thin homogeneous material at about 30½ degrees C. until the mass becomes dry. With the end in view of eliminating any lumps in the material that may contain any uneffected waxy substance, the mass is thoroughly triturated, and is preferably mixed with chemically pure sodium chloride and sterile water to produce an emulsion, the sodium chloride accomplishing the breaking up of any cellular elements which may be present such as leucocytes and interstitial and tissue cells. The material thus obtained is suitable for sub-dermal administrations. Should a substance be desired for intravenus administration, further purification by extraction with ether and filtration is desirable. Some suitable material may be added for preservative purposes if the product is to be stored for hypodermic use.

It will be seen that there has been provided a vaccine which results from a cellular reaction on the part of the interstitual and tissue cells of the injected mammal towards the tubercle bacilli. This material when first withdrawn from the mammal contains tubercle bacilli in varying degrees of disintegration, and also serum and cellular anti-bodies and enzymes that act to produce disintegration of the tubercle bacilli and neutralization of its toxines. The whole tubercle bacilli is contained in the vaccine in completely disintegrated form, because of the action of the serum, cellular anti-bodies and enzymes of the mammal injected, and because of the mechanical and chemical treatment to which it is subjected in its preparation. The vaccine contains the tubercle bacilli in an absorbable form because of the action they have undergone in the subjected animal and because of the mechanical and chemical treatment used in its preparation; and the vaccine because of its anti-body content and vaccine content is able to produce immunizing reactions when injected in a mammal or a human being.

What I claim as my invention and desire to secure by Letters Patent is:

1. The process of making vaccine of tubercle bacilli which consists in killing the tubercle bacilli, injecting the killed tubercle bacilli into an animal, evacuating the fluctuating mass developed upon the animal at the point of injection to obtain a liquid, and treating the liquid thus obtained to break down capsular structures to render its absorption complete into another mammal in which it may be injected subsequently.

2. The process of making vaccine of tubercle bacilli which consists in killing the tubercle bacilli, injecting the killed tubercle bacilli into an animal, evacuating the fluctuating mass developed upon the animal at the point of injection to obtain a liquid, and mechanically treating the liquid thus obtained to break down capsular structures to render its absorption complete into another mammal in which it may be injected subsequently.

3. The process of making vaccine of tubercle bacilli which consists in killing the tubercle bacilli, injecting the killed tubercle bacilli into an animal, evacuating the fluctuating mass developed upon the animal at the point of injection to obtain a liquid, and chemically and mechanically treating the liquid thus obtained to break down capsular structures to render its absorption complete into another mammal in which it may be injected subsequently.

4. The process of making vaccine of tubercle bacilli which consists in killing the tubercle bacilli, injecting the killed tubercle bacilli into an animal, evacuating the fluctuating mass developed upon the animal at the point of injection to obtain a liquid, and treating the liquid thus obtained with ether to break down any remaining capular structures and triturating the liquid mass to break up the remaining cellular forms.

5. The process of making vaccine of tubercle bacilli which consists in killing the tubercle bacilli, injecting the killed tubercle bacilli into an animal, evacuating the fluctuating mass developed upon the animal at the point of injection to obtain a liquid, treating the liquid thus obtained with ether to break down any remaining capsular structures and triturating the liquid mass to break up the remaining cellular form, and drying the liquid to produce a dry mass, triturating the dry mass and mixing the thoroughly triturated mass with a solution of sodium chloride to produce an emulsion from the triturated mass, and adding a suitable liquid to the triturated mass to make a product suitable for use hypodermically.

6. The process of making a vaccine of tubercle bacilli which consists in providing virulent cultures of tubercle bacilli in a sterile saline solution, heating the solution to kill the tubercle bacilli, injecting the killed tubercle bacilli into a mammal, and evacuating the fluctuating mass developed upon the mammal to obtain a liquid and treating the liquid thus obtained to break down any capsular structures to render its absorption complete in any mammal in which it may be injected subsequently.

7. A vaccine of tubercle bacilli obtained from a fluctuating mass developed upon a mammal through the injections of killed tubercle bacilli in the mammal and containing tubercle bacilli in varying degrees of disintegration and also serum and cellular bodies and enzymes that act to produce disintegration of the tubercle bacilli and neutralization of its toxines and free from non-absorbable tubercle bacilli.

8. A vaccine of tubercle bacilli obtained from a fluctuating mass developed upon a mammal through the injection of killed tubercle bacilli and having its partially digested tubercle bacilli in an absorptive form.

9. A vaccine of tubercle bacilli obtained from a fluctuating mass developed upon the mammal through the injection of killed tubercle bacilli in the mammal and having its partially digested tubercle bacilli in disintegrated and absorptive form.

10. The process of making a vaccine of tubercle bacilli which consists in providing virulent cultures of tubercle bacilli in a sterile normal saline solution, heating the solution with the tubercle bacilli to kill the tubercle bacilli, injecting the solution with the killed tubercle bacilli into a healthy mammal whose resistance to this type of infection is high, evacuating the fluctuating mass developed upon the mammal to obtain a liquid containing defensive anti-bodies and partially digested tubercle bacilli, adding ether to the liquid, triturating the same to eliminate all lumps and produce a thin homogeneous material, eliminating the ether by slow evaporation until a dry mass is obtained, triturating the mass to eliminate any lumps, and mixing the dry mass with a solution of sodium chloride to produce an emulsion.

JACOB S. KOMINZ.